United States Patent [19]

Spiers

[11] 4,448,593
[45] May 15, 1984

[54] WATER AIR FILTER

[76] Inventor: Walter A. Spiers, 4000 E. Fletcher Ave., Apartment #J106, Tampa, Fla. 33612

[21] Appl. No.: 387,789

[22] Filed: Jun. 14, 1982

[51] Int. Cl.³ .............................................. B01D 47/02
[52] U.S. Cl. ..................................... 55/227; 55/217; 55/234; 55/419; 55/DIG. 28; 261/18 A; 261/27; 261/120; 261/107; 123/25 A
[58] Field of Search ................. 261/18 A, 70, 99, 104, 261/107, 129, DIG. 65, 27, 120; 55/217, 225, 227, 229, 234, 251, 252, 267, 342, 419, DIG. 28; 123/25 A, 25 B

[56] References Cited

U.S. PATENT DOCUMENTS

| 162,523 | 4/1875 | Bickford | 261/99 |
|---|---|---|---|
| 433,495 | 8/1890 | Smith | 261/107 |
| 765,351 | 7/1904 | Avery et al. | 261/107 |
| 1,093,718 | 4/1914 | Myers | 261/70 |
| 1,319,316 | 10/1919 | Wright et al. | 261/107 |
| 1,640,291 | 8/1927 | Perkins | 261/107 |
| 1,646,329 | 10/1927 | Ulrich | 261/107 |
| 1,771,814 | 7/1930 | Osborn et al. | 261/70 |
| 1,952,984 | 3/1934 | Hess et al. | 261/129 |
| 2,498,818 | 2/1950 | Nogle | 261/99 |
| 3,139,462 | 6/1964 | Scott | 261/70 |
| 3,672,342 | 6/1972 | Ojala | 55/267 |
| 3,756,577 | 9/1973 | Breiling | 261/DIG. 65 |
| 3,885,843 | 5/1975 | Rubel | 261/99 |
| 3,998,613 | 12/1976 | Attig | 55/256 |
| 4,153,435 | 5/1979 | Fischer | 261/70 |

Primary Examiner—David L. Lacey
Attorney, Agent, or Firm—Oldham, Oldham, Hudak, Weber & Sand Co.

[57] ABSTRACT

A device is disclosed which humidifies the incoming air to an internal combustion engine or an air compressor. The device employs a moistened wick which transfers water from a water reservoir to the incoming air. The humidified air reduces the carbon build-up in an engine and increases the efficiency thereof. A humidistat is provided for automatic adjustment of humidity and the heating of incoming air prior to humidification.

4 Claims, 4 Drawing Figures

WATER AIR FILTER

TECHNICAL FIELD

The invention herein lies in the art of air filters for internal combustion engines and air compressors. Specifically, the invention describes a device which will both moisten and filter the air entering the devise. The addition of moisture to the air facilitates fuel economy and/or cleaner operation with less carbon build-up.

BACKGROUND ART

It has long been known in the art that the use of humidified air in the operation of an internal combustion engine or an air compressor improves the operational characteristics of the device. For instance, the engine runs cooler because some of the heat produced during combustion is consumed in raising the temperature of the moisture vapor in the air. At these lower operating temperatures, less pollutants such as oxides of nitrogen are produced. Improvements in gas mileage have been noted because, among other things, a leaner air-to-fuel mixture may be used when the air has been moistened.

The instant invention discloses an apparatus which humidifies air entering an internal combustion engine, an air compressor or the like. The apparatus has a reservoir of water, a wick of burlap or other material capable of maintaining a capillary action, and a float secured to the wick and resting on the surface of the water reservoir. In one embodiment, the amount of humidity is adjustable by means of adjustment of the length of burlap secured to the float.

While the prior art contains many devices which are capable of humidifying air, all lack one or more of the elements disclosed in the instant invention.

U.S. Pat. No. 2,153,248 to Hardt, describes an air humidifier for a carburetor mounted between the carburetor and the air cleaner. The device has a separate water reservoir but contains no float and no means for control of humidity. U.S. Pat. No. 2,531,071, to McKinzey relates to an improved moist air filter for use on internal combustion engines. The reference discloses the use of a device mounted on top of the intake manifold of an engine and provides for an auxiliary water reservoir. There is no means for adjustment of humidity and an auxiliary water reservoir must be utilized to supply water to the filter.

U.S. Pat. No. 3,589,688 to Ottofy, refers to a humidifying device positioned within an intake duct to an internal combustion engine. No means are disclosed for adjustment of humidity entering the engine nor is there use made of a float or means to filter the incoming air to the engine.

U.S. Pat. No. 3,139,462 to Scott, refers to the use of a humidifier to be employed with warm air furnace installations and room air conditioning units. As this reference does not deal with the use of humidified air in internal combustion engines or compressors, it is not pertinent.

U.S. Pat. No. 1,566,332 to Lilly, discloses a humidification device for an internal combustion engine in which a wick, dipped in a water reservoir moistens exhaust gases from the exhaust manifold and recirculates this moistened exhaust to the intake manifold of the engine. No means is disclosed for adjustment for the level of humidity nor is there any use of a float to maintain a constant wick area.

U.S. Pat. No. 3,977,364 to Gijsbers, et al, concerns an apparatus for evaporating liquids which comprises at least one heatable wall and means for distributing the liquid over said wall in the form of a thin film. As this invention does not relate to the humidification of air for internal combustion engines or air compressors, it is not pertinent.

DISCLOSURE OF INVENTION

It is an aspect of the instant invention to provide a means for controlled humidification of air entering an internal combustion engine or an air compressor.

Another aspect of the instant invention is to provide a humidifier which will also function as a filter and replaces the existing air filter on an engine or an air compressor.

Still another aspect of the instant invention is to provide a filtering and humidifying device which will give a relatively constant humidity to the air entering the engine or air compressor.

A still further aspect of the instant invention is to provide a device, as above, which will reduce carbon build-up and extend the life of an engine or an air compressor.

A still further aspect of the invention is to provide a device, as above, having means for adjustment of the level of humidity of air.

Still another aspect of the instant invention is to provide a device, as above, having means for maintaining a preset humidity of the air passing through said device when the volume of air changes.

These objects and others which will become more apparent as the detailed description proceeds are achieved by: a humidifying filter, comprising: a water absorbent wick; support means for said wick; a container having a water reservoir therein in which at least the lower perimeter of said wick is submerged; an air impermeable surround connecting in airtight fashion the upper perimeter at a location above the water level of said reservoir; a float secured to said support means and floating in said reservoir; and air inlet and outlet means providing for passage of air through an unsubmerged portion of the said wick.

Additionally, a multi-celled humidifying filter, comprising: a plurality of cells, each cell comprising: a water absorbent wick; support means for said wick; a container having a water reservoir therein in which at least the lower perimeter of said wick is submerged; an air impermeable surround connecting in air tight fashion the upper perimeter of said wick with the perimeter of said container at a location above the level of said reservoir; an air inlet and outlet means providing for passage of air through an unsubmerged portion of said wick.

BRIEF DESCRIPTION OF DRAWINGS

For a complete understanding of the objects, techniques, and structure of the invention, reference should be had to the following detailed description and accompanying drawings, wherein.

BEST MODE FOR CARRYING OUT THE INVENTION

Figure 1:
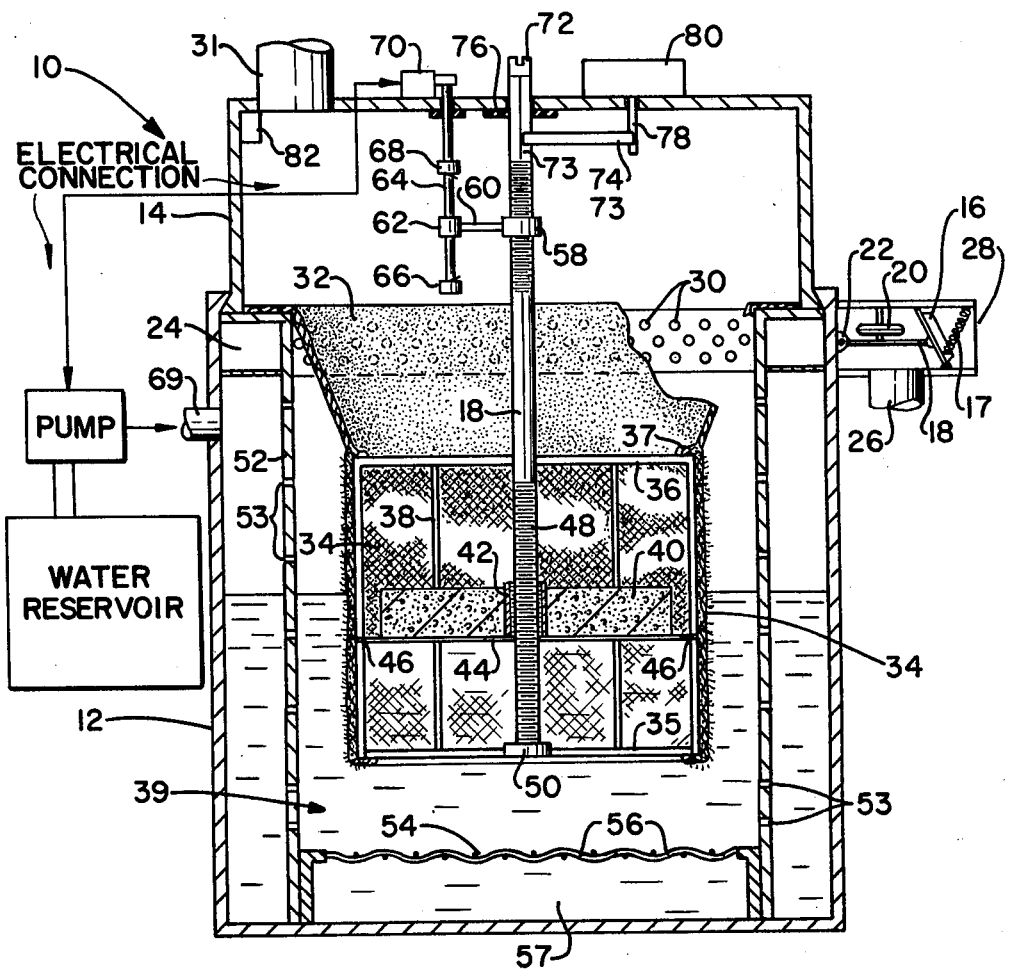
FIG. 1 is a side elevational view of the humidifying filter.

FIG. 1 illustrates in detail a humidifying filter, designated generally by the number 10. Filter 10 comprises a container 12 and a removable lid 14 secured to said container. With lid 14 in place, filter 10 is sealed except for air inlet and outlet means.

Container 12 has a water reservoir 39 in which at least the lower portion of a wick 34 is submerged. Wick 34 may be constructed of any water absorbent material possessing capillary action, such as cotton, burlap and various woven blends of synthetic polymers such as polyester and nylon. Wick 34 may be conformed to a tubular shape through support means 35, which by way of illustration, may be a wire basket having a plurality of vertical wire pieces 38 positioned at spaced intervals along one or more wire perimeters 36. Support means 35 may however be one of a variety of shapes, the only requirements being the ability to stretch the wick in a continuous fashion over a length, and having sufficient open area to allow air to pass through the wick unimpeded. Support means 35 may for instance have a rectangular, square or circular cross-section, or may be in the form of a channel. Preferably, wick 34 is secured at least to the bottom of support 35.

Secured in airtight fashion to wick 34 at its upper perimeter 37 is an air impermeable surround 32. Surround 32 is constructed of a flexible material and in turn is secured, again in airtight fashion, to the perimeter of container 12 at a location above one or more air inlet holes 30. Surround 32 allows freedom of movement of wick 34 while at the same time prevents air entering intake holes 30 from by-passing the wick. The surround may be constructed of, for example, tightly woven nylon or other synthetic or natural fiber, a flexible polymer film or a rubber or rubber coated cloth.

Support means 35 has, secured at its lower end and preferably at or near the center of the cross-sectional area thereof, a foot bearing 50 in which is rotatably disposed a rod 18. Rod 18 has a threaded lower section 48 to which is threadably secured a float platform 44 having mating threads 42. A float 40 is secured to float platform 44 and floats on the surface of said water reservoir 39. Because of the interconnections described above, it can be seen that the buoyancy of float 40 also causes floatation of support means 35 and wick 34. Float 40 may be constructed of any material which has a positive buoyancy, such as plastic or plastic foam. Alternatively, the float may be a hollow shape in which air is contained in a sealed cavity, such as is commonly used in flush toilets where a hollow metal ball is used.

The surface area of wick 34 left unsubmerged in reservoir 39 is a function of the position of float 40 along rod 18. By rotation of rod 18, float 40 may be repositioned with respect to the length of wick 34 and thus the unsubmerged surface area of the wick may be increased or decreased accordingly. As rod 18 is rotated, mating threads 42 are kept from rotating with the rod by means of platform extensions 46 which are in slidable engagement with vertical members 38.

Rod 18 may be rotated manually by means of an extension 72 which is slidably mounted in lid 14, and having means for airtight sealment 76. Rod 18 may alternatively, or in addition be rotated through communication with a motor 80, said motor being activated by a humidity control input described hereinafter. The interconnection between said rod and said motor may be any conventional means, for example, a gear 74 having teeth which mesh with a squared section 73 of rod 18 and with a motor shaft 78.

Humidifying filter 10 may be used on an internal combustion engine or an air compressor. In either case, filter 10 may replace the existing air filter, as wick 34 may serve the dual purpose of humidifying and filtering incoming air. The installation consists of connecting an outlet conduit 31 by well known means to an intake manifold of an engine or compressor (not shown), thereby creating a low pressure area in lid 14 and in the volume encompassed by surround 32.

Because of the sealment between the upper perimeter of wick 34 and surround 32, air is drawn through air intake hole or holes 30, through the unsubmerged portion of the wick and ultimately into the intake manifold (not shown). Because wick 34 is at least partially submerged in water reservoir 39, the capillary action of the wick draws water into the unsubmerged portion thereof. As incoming air passes through wick 34, moisture is transferred from the wick to the air in the form of increased humidity. In addition, dust and dirt particles suspended in the incoming air are trapped in wick 34, which thus acts as an air filter. The air filtering effect is enhanced by the fact that the unsubmerged portion is damp, which aids in precipitating dust particles.

Humidification and filtering effects of wick 34 are a function of the type of material used and the fiber density, i.e., the type of weave, if any, and the fiber size. While a variety of materials can be used for wick material, as recited above, the preferred materials are woven cotton and burlap. These have excellent capillary action and, if the weave is sufficiently fine, provide the requisite filter action. While these two materials are preferred, it will be appreciated that other materials may be used having a variety of fineness of weave as the particular application requires. Those skilled in the art can readily determine the optimum material and weave, if any.

Dirt trapped in wick 34 may eventually slough off and fall into water reservoir 39. A dirt trap 54 positioned at the bottom of reservoir 39 and having a plurality of apertures 56 removes a quantity of this material. Because dirt is generally heavier than water and, depending upon the particle size, at some point in time settles to the bottom of reservoir 39, it passes through apertures 56 and thus accumulates in volume 57 beneath the trap where it may be periodically removed.

The highest efficiency of humidification and filtration is achieved when incoming air passes through wick 34 in a uniform and evenly distributed manner. Intake apertures 30 may thus be distributed evenly about the perimeter of container 12 so that the flow of incoming air is not concentrated at a particular point. Even distribution of incoming air presents a particular problem when the filter 10 is used on internal combustion engines. As is well known, such engines run best when incoming air is at a temperature of around 90° F. It is thus often times necessary to heat incoming air, commonly by using heat extracted from exhaust gases. The need for heating incoming air is further made necessary by the evaporative cooling effect of humidification. That is, as liquid moisture is transferred to the incoming air, a quantity of energy is consumed equal to the latent heat of water, and is reflected in a lowered air temperature. In any event, the filter 10 must incorporate means for heating and redistributing incoming air prior to its passage through wick 34. FIG. 1 illustrates the preferred design for accomplishing this.

The temperature of incoming air is controlled by means of a thermostat 20 applying pressure to a shaft 18 secured at one end to a hinge 22 and at the other to a flapper 16 having a spring retainer 17. Outside air inlet 28 and hot air inlet 26 are positioned as shown. Hot air is obtained from a conduit leading to a heat exchanger (not shown) which, as above, extracts heat from the engine's exhaust pipe (not shown) Depending upon the temperature of the incoming air, thermostat 20 applies an appropriate pressure to shaft 18, which thus pivots on hinge 22 to reposition flapper 16, thus allowing air to enter from the appropriate inlet.

Redistribution of heated incoming air is accomplished by means of air inlet ring 24 which provides an inner volume encompassing the entire perimeter of container 12. An inner container wall 52 may also be utilized to aid the distribution of air flow to wick 34. Inlet apertures 30 are then evenly distributed about the upper perimeter of wall 52. Apertures 53 which are located along innerwall 52 allow equalization of the reservoir water level within the container.

The number and diameter of inlet aperatures 30 is a function of the amount of air which must pass through the filter. Thus, the number of apertures may vary from less than 5 to 50 or more having a diameter of from 1/16 inch to 3/16 inch.

As moisture is transferred from wick 34 to the incoming air, the level of water in the reservoir 39 drops. However, because float 40 floats just below the surface of reservoir 39 no matter what the water level, it is apparent that the area of unsubmerged wick remains constant, and therefore the amount of moisture transferred to the incoming air also remains constant. Eventually however, as the water in reservoir 39 is depleted, means must be provided for its replacement. This may be done manually by removal of lid 14 to provide access to reservoir 39 or, as illustrated in FIG. 1, automatic means may be provided for refilling of the reservoir. Rod 18 may contain, on a threaded upper portion thereof, a refill nut 58 in threadable communication with said upper portion, and an arm 60 attached to said refill nut which also contacts a bracket 64. Bracket 64 has low level and high level switches 66 and 68 respectively which are positioned on the bracket such that the distance between them is of a length equal to or slightly less than the depth of reservoir 39 when full. Bracket 64 in turn is secured to a toggle switch 70 positioned atop lid 14 which activates a refilling means (not shown) which may consist of, for example, a remote water storage tank having a gravity or pump driven refill feed.

As the water level in reservoir 39 drops, arm 60, by reason of its connection to rod 18, drops correspondingly until it reaches low level switch 66. Pressure from arm 60 on switch 66 opens toggle switch 70 which in turn activates refill of the reservoir, wherein water from the storage tank enters through a refill inlet 69. As the reservoir 39 fills, arm 60 rises with rod 18 until the former strikes high level switch 68 which then causes bracket 64 to reposition toggle switch 70, thereby terminating the refilling operation. In a fashion similar to rod 18, bracket 64 possesses slidable sealment means where it passes through lid 14.

Because the repositioning of float 40 by rotation of rod 18 causes said rod to ride higher or lower in reservoir 39, it is seen that means must be provided for offsetting the corresponding reposition of arm 60, otherwise the automatic refilling means will be activated at improper times. The threaded engagement of refill nut 58 with rod 18 achieves the offset. Thus, when rod 18 is rotated to reposition float 40, refill nut 58 is repositioned in parallel to said float and thereby the position of arm 60 is dependent solely upon the level of water in reservoir 39. A sleeve 62 is provided for arm 60 which aids in slidable securement of the arm on bracket 64 and which prevents rotation of refill nut 58 in unison with rod 18 when an adjustment is made.

Repositioning of float 40 and consequently the altering of the amount of wick 34 left unsubmerged in reservoir 39 has the following effect on the humidity of air leaving the filter 10.

It has been discovered that a strong relationship exists between the humidity of the exiting air and the length of the unsubmerged wick. That is, the higher wick 34 is raised above the surface of reservoir 39 by the position of float 40, the *less* the amount of humidity in the air exiting the filter 10. This is probably due to the increasing inability of the capillary action of the wick to replenish moisture lost to the flow of air as the distance from the reservoir 39 increases. Thus, the greatest amount of moisture is transferred to the incoming air when wick 34 has only a small portion thereof left unsubmerged in the reservoir. Moisture transfer is, of course, also increased with wick 34 at this position due to the increased superficial velocity of a given air flow through the diminished wick area.

The actual height of wick left unsubmerged which will yield the maximum humidity increase is of course a function of the weave and the capillary properties of the wick material. A material having exceptional capillary action will allow a greater surface area to be unsubmerged without becoming dried out as compared to other materials. In some such cases, the greater area available for airflow minimizes the contribution of superficial air velocity to humidification, in which case humidity is *directly* proportional to unsubmerged wick area.

The humidity of air exiting outlet conduit 31 may be controlled by means of a humistat 82 positioned in adjacent said outlet conduit. Humistat 82, sensing the air humidity, activates the motor 80 which thereupon positions float 40 through interconnection to rod 18, as described above. For example, if the humidity falls below a predetermined level, motor 80 is activated to rotate rod 18 in a direction such that float 40 travels up the rod. This in turn decreases the height of wick 34 which is unsubmerged in the reservoir. Moisture transfer to the air is thereby increased. In like manner, if the humidity rises above the predetermined level, the wick level rises, and moisture transfer is decreased. Motor 80 is controlled by humistat 82 through well known means,for example, as is used in domestic furnaces.

Figure 2:
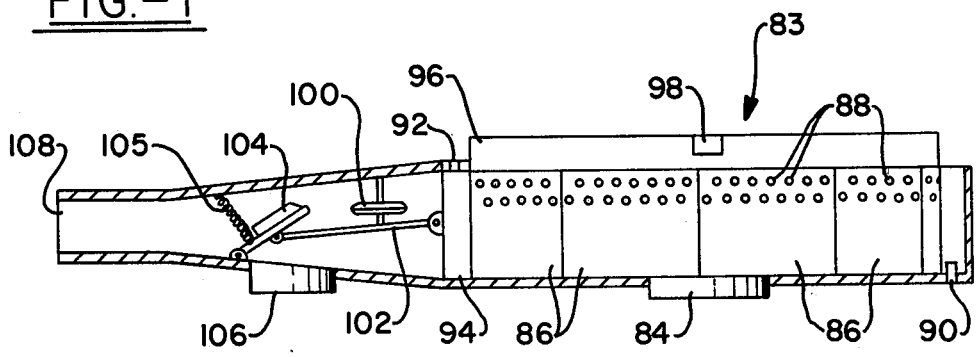
FIG. 2 is a side elevational view of a multi-celled humidifying filter.
Figure 3:
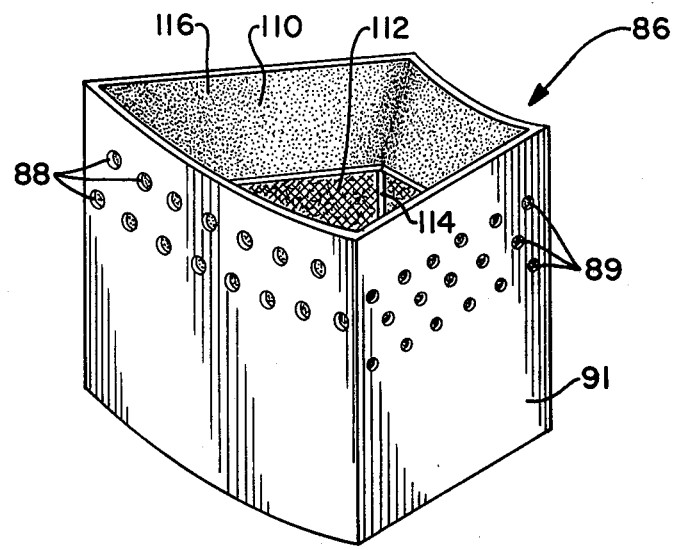
FIG. 3 is an isometric view of a cell of the multi-celled humidifying filter.

Another embodiment of this invention is illustrated by FIGS. 2 and 3 wherein a multi-celled humidifying filter is illustrated and designated generally by the number 83. Filter 83 is designed to replace the air filter on the internal combustion engine in an automobile. Although the design shown is circular, it will be appreciated that various other shapes may be employed which allow ready adaptation to a particular automobile design. When so constructed, filter 83 may replace a conventional air filter without any modification to the engine.

Figure 4:
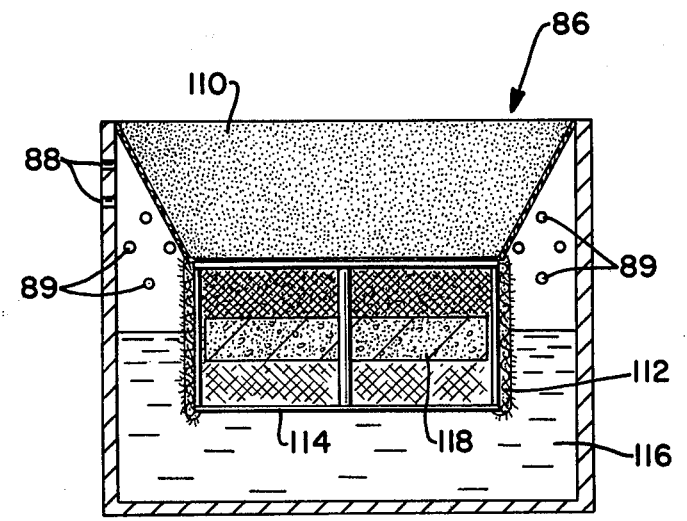
FIG. 4 is a side elevational view of a cell, as above, showing the internal construction.

From the Figures, it can be seen that filter 83 has a plurality of cells 86, each of which contain a wick 112, a support 114, an air impermeable surround 110 and a reservoir 116, all of which are similar to those described in the previous embodiment. As shown in FIG. 4, filter cell 86 does not contain a rod attached to float 118 as in the previous embodiment. Thus, the level of wick 112 and consequently the humidity of air exiting filter 83 is not adjustable. It will be appreciated however, that humidity adjustment means as recited above could indeed be used.

Cell 86 has a plurality of holes 88 and 89. Air inlet holes 88 receive incoming air from air inlet distribution chamber 94. Water distribution holes 89 allow even distribution of water among the reservoirs 116 of the cells 86. Filter 83 may contain means for heating incoming air comprising a thermostat 100, shaft 102, flapper 104, retaining spring 105 and hot air and fresh air inlets 106 and 108 respectively. Heating of incoming air is thus controlled in a manner similar to that described hereinabove.

When reservoirs 116 become depleted through transfer of moisture to incoming air, they may be replenished by manual means, viz., adding water through a refill port 92. Alternatively, a humistat 98 and an overfill switch 90 may be utilized as follows. Depletion of reservoirs 116 cause a sudden drop in air humidity, in turn causing humistat 98, located in filter lid 96, to activate a refilling means (not shown), which can consist of a remote water storage tank having gravity or pump propelled transfer. Refilling is accomplished by transfer of water to the filter 83 through inlet 92 which is located within one of the cells 86.

Water is distributed, as above, by water distribution apertures 89 located along partitions 91 separating each cell. As can be seen in FIG. 3, apertures 89 are positioned lower than air inlet apertures 88, thus, once the reservoirs 116 have been filled, water beings overflowing out air inlet apertures 88 and into the air inlet distribution chamber 94. Overfill switch 90 located at the bottom of the distribution chamber 94 automatically terminates refilling when it senses water.

In operation, humidifying filter 83 fits over the intake manifold (not shown) of an automobile engine, outlet aperture 84 being positioned directly above the manifold. In general, it has been found that the number of cells 86 may vary between 4 and 15 with about 10 being preferred. The advantage of having a multi-celled humidifying filter instead of a single celled unit is that, in a moving vehicle, the cellular structure minimizes wave action and consequently water loss. Further, the humidification can be tailored by adding or removing one or more of the cells.

Use of humidifying filter 10 or 83 reduces carbon build-up in an engine and can increase gas mileage when used in a vehicle. Generally, mileage may be increased between 5 and 35% depending on the vehicle.

In an air compressor, a humidifying filter 10 dramatically reduces carbon build-up which causes approximately 90% of maintenance problems.

In general, humidifying filters 10 and 83 may be constructed of materials well known in the art, such as steel, aluminum and other metals, and plastics such as polystyrene, acrylonitrile-butadiene-styrene, and the like. For multi-celled humidifying filter 83, steel or aluminum are preferred, due to the demanding requirements of automobile use.

While in accordance with the Patent Statutes, only the best mode and preferred embodiments have been disclosed, it is to be understood that the invention is not limited thereto or thereby. Therefore, for a full appreciation of the scope and breadth of the invention, reference should be made to the following appended claims.

What is claimed is:

1. A humidifying filter, comprising:
    a container having a water reservoir therein;
    a wick disposed in said container and having at least the lower portion thereof submerged in said reservoir;
    an air impermeable surround connecting in air tight fashion the upper perimeter of said wick with the perimeter of said container at a location above the water level of said reservoir;
    a wick support stretching said wick over an area;
    a rod rotatably secured to said wick support;
    a float threadably engaged on the lower portion of said rod;
    an air inlet in the wall of said container positioned between the water level of said reservoir and the perimeter of attachment of said surround; and
    an outlet conduit positioned on the upper portion of said container above the perimeter of attachment of said surround.

2. A humidifying filter according to claim 1, wherein said float is hollow and is constructed of metal.

3. A humidifying filter according to claim 1, wherein said filter has an automatic reservoir refill, comprising:
    said rod having a threaded upper section;
    a refill nut matingly disposed on said threaded upper section;
    an arm secured at one end to said refill nut and slidably secured at the other end to a bracket extending into said container parallel to said rod;
    high and low level switches secured to said bracket and separated by a distance equal to or slightly less than the depth of said reservoir when full;
    a toggle switch activated by said high and lower level switches and in electrical communication with a pump; and
    a remote water storage tank connected to said pump;
    wherein said arm is slidably secured to said bracket between said high and low level switches.

4. A humidifying filter according to claim 3, wherein said refill nut is positioned on said rod such that said arm trips said low level switch when said reservoir is low and trips said high level switch when said reservoir is full.

* * * * *